(12) United States Patent
Sengupta et al.

(10) Patent No.: US 9,729,659 B2
(45) Date of Patent: Aug. 8, 2017

(54) CACHING CONTENT ADDRESSABLE DATA CHUNKS FOR STORAGE VIRTUALIZATION

(71) Applicant: Microsoft Corporation, Redmond, WA (US)

(72) Inventors: Sudipta Sengupta, Redmond, WA (US); Chenguang Zhu, Stanford, CA (US); Chun Ho Cheung, Redmond, WA (US); Jin Li, Bellevue, WA (US); Abhishek Gupta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 13/830,950

(22) Filed: Mar. 14, 2013

(65) Prior Publication Data
US 2014/0280664 A1 Sep. 18, 2014

(51) Int. Cl.
| | |
|---|---|
| *G06F 15/16* | (2006.01) |
| *H04L 29/08* | (2006.01) |
| *G06F 17/30* | (2006.01) |
| *G06F 12/0866* | (2016.01) |
| *G06F 12/0804* | (2016.01) |

(52) U.S. Cl.
CPC ...... *H04L 67/2842* (2013.01); *G06F 12/0866* (2013.01); *G06F 17/30097* (2013.01); *G06F 17/30132* (2013.01); *G06F 17/30159* (2013.01); *G06F 12/0804* (2013.01)

(58) Field of Classification Search
CPC .. G06F 17/30159; G06F 3/0608; G06F 3/067; G06F 17/30097; G06F 12/0866; G06F 17/30132; G06F 12/0804; H04L 29/08; H04L 67/2842

USPC ........................................................ 709/212
See application file for complete search history.

(56) References Cited

U.S. PATENT DOCUMENTS

| | | | |
|---|---|---|---|
| 3,848,234 A * | 11/1974 | MacDonald | 711/119 |
| 7,979,509 B1 | 7/2011 | Malmskog et al. | |
| 2005/0027798 A1* | 2/2005 | Chiou et al. | 709/203 |

(Continued)

FOREIGN PATENT DOCUMENTS

CN 102880626 A 1/2013

OTHER PUBLICATIONS

"International Search Report and Written Opinion Issued in PCT Patent Application No. PCT/US2014/025111", Mailed Date: Oct. 29, 2014, 14 Pages.

(Continued)

*Primary Examiner* — Glenton B Burgess
*Assistant Examiner* — Tan Doan (57) ABSTRACT

The subject disclosure is directed towards using primary data deduplication concepts for more efficient access of data via content addressable caches. Chunks of data, such as deduplicated data chunks, are maintained in a fast access client-side cache, such as containing chunks based upon access patterns. The chunked content is content addressable via a hash or other unique identifier of that content in the system. When a chunk is needed, the client-side cache (or caches) is checked for the chunk before going to a file server for the chunk. The file server may likewise maintain content addressable (chunk) caches. Also described are cache maintenance, management and organization, including pre-populating caches with chunks, as well as using RAM and/or solid-state storage device caches.

20 Claims, 7 Drawing Sheets

(56) References Cited

U.S. PATENT DOCUMENTS

| | | |
|---|---|---|
| 2009/0063528 A1* | 3/2009 | Yueh .......................... 707/101 |
| 2010/0030871 A1* | 2/2010 | Jolly .................... H04L 63/123 |
| | | 709/219 |
| 2010/0088296 A1 | 4/2010 | Periyagaram et al. |
| 2010/0094817 A1* | 4/2010 | Ben-Shaul et al. ........... 707/697 |
| 2011/0131341 A1 | 6/2011 | Yoo et al. |
| 2012/0110108 A1 | 5/2012 | Li et al. |
| 2012/0151177 A1* | 6/2012 | Kalach .................. G06F 3/0608 |
| | | 711/203 |
| 2012/0194534 A1* | 8/2012 | Benno et al. .................. 345/557 |
| 2012/0210068 A1 | 8/2012 | Joshi et al. |
| 2012/0215970 A1* | 8/2012 | Shats .................. G06F 12/0866 |
| | | 711/103 |
| 2012/0290630 A1* | 11/2012 | Aizman ............ G06F 17/30233 |
| | | 707/827 |

OTHER PUBLICATIONS

"International Preliminary Report on Patentability Issued in PCT Application No. PCT/US2014/025111", Mailed Date: Jun. 23, 2015, 6 Pages.

"Office Action and Search Report Issued in Chinese Patent Application No. 201480015103.3", dated May 2, 2017, 18 pages.

\* cited by examiner

CACHING CONTENT ADDRESSABLE DATA CHUNKS FOR STORAGE VIRTUALIZATION

BACKGROUND

Virtualization is a desirable technology in many contemporary datacenter and cloud computing infrastructures. In general, virtualization provides for higher utilization for servers by running multiple applications in isolated containers (Virtual Machines or VMs) over a thin Virtual Machine Monitor (VMM) or Hypervisor (Hyper-V) layer. The Hyper-V virtualizes resources on the machine so as to give each VM container the illusion that it is the only operating system running on the server. In actuality, each container may run applications over an operating system that may be different across containers.

Virtualization involves multiplexing of CPU, memory, and storage resources across VMs, and much of the design work in the virtualization area considers how to do such operations in a performant and resource efficient way. CPU is virtualized using scheduling within and across cores. Memory is often allocated per VM and shared using dynamic memory management techniques. Disk storage is more difficult to virtualize because of interference between VMs that results from disk head seeks on the same spindle. Moreover, when storage is across the network (as in a separate storage cluster or across the WAN in a public cloud), access to storage also involves network latency and has to deal with network bandwidth constraints, because the datacenter network is shared across many applications and is often over-subscribed.

A virtual hard disk (VHD) file comprises file content that appears to each virtual machine as if it is the virtual machine's own hard drive. One attempt to make storage more efficient in size and access is to use read-only VHDs that use "gold" master images as their underlying content, and then track individual chains of differences/deltas as the hard drive content changes over time. This is undesirable for various reasons.

One example scenario is Virtual Desktop Infrastructure (VDI) where virtual desktops boot and run off VHDs. Even with gold images and deltas, the often poor virtualized storage performance for VDI can cause slow boot/login performance and reduced application performance, which impacts and degrades the user experience. For example, when many users reboot or login at the same general time, such as just after lunch, it can take considerable time (on the order of several minutes) for a user to have a reasonably functioning machine.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a compute machine includes logic configured to convert a request for a range of data to a request for content addressable data. One or more client-side content addressable caches may be accessed to obtain the content addressable data if cached in a client-side cache. If not, a file server machine is requested to return the content addressable data; the server may access the content addressable data via one or more server-side content addressable caches.

In one aspect, primary data deduplication is used to satisfy a request for a range of data by accessing one or more chunks of data, in which each chunk of data has an identifier that uniquely identifies the chunk data. At least one fast access chunk cache is accessed to return the chunk data if cached. If not cached, the chunk is returned from another storage device. The returned chunk data is converted to the requested range of data in response to the request for the range of data.

In one aspect, there is described running a plurality of virtual machines, each virtual machine associated with a virtual hard disk. Upon receiving a request for a range of data associated with a virtual hard disk file from a program running on a virtual machine, the request for the range of data is converted into a chunk identifier set comprising one or more chunk identifiers. The chunk identifier set is used to access one more chunks of data in a fast tier cache. The one or more chunks of data are converted into the range of data, which is returned in response to the request.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards identifying common data that is accessed across workloads (e.g., of VMs) and placing the common data on a fast access tier, e.g., cache media containing RAM and/or solid-state storage devices SSDs). For example, the storage layer may be made content-addressable by converting file range accesses to chunk hash accesses, (e.g., using primary data deduplication). Unlike conventional file-based caches, in which entire files are cached, the data chunks are maintained in a content-addressable fast-access tier (cache) that serves data blocks (e.g., chunks) that each have a unique identifier (e.g., the SHA hash of that data block).

In one aspect, one or more caches are located so as to alleviate storage bottlenecks. In one implementation, this includes a cache on a compute machine that is running virtual machines, which reduces bytes on the wire and mitigates network latency and bandwidth bottlenecks, along with a cache on the file server machine to reduces disk IOPs within that file server. Moreover, in computing environments having multiple compute machines, e.g., on the same rack, intra-rack communication or the like may be used to provide a larger intra-rack (or simply "rack") cache that avoids network latency and bandwidth bottlenecks. Server-side rack caches or the like are also feasible.

In one aspect, data deduplication techniques are leveraged for improving the performance of virtualized storage. Data deduplication, which is already in use in many virtualized computing environments, provides for chunking of file data into chunks and uniquely identifying each chunk, so that, for example, multiple chunks of same content need only be stored once, with each file that needs that chunk's data for a range of file data only needs to contain a reference to that duplicated chunk.

It should be understood that any of the examples herein are non-limiting. For instance, data deduplication techniques and components are exemplified herein, in part because they are already present and thus convenient to leverage in the exemplified virtualization environment, however there is no requirement that an amount (e.g., chunk) of data actually be deduplicated for storage savings. Thus, "primary" deduplication techniques and components are leveraged in one example implementation. For another, a Virtual Desktop Infrastructure (VDI) in which virtual desktops boot and run off VHDs is used as an example, because the underlying virtual machines tend to access similar content during boot/login and when running common applications and may significantly benefit from the technology described herein; however, this is only one example, and is understood to be non-limiting with respect to the broader applicability. The technology may be equally applicable to access web content and/or cloud content over the Internet, in which the range access request may be converted to content addressable access request that can benefit from the current technology. Still further, while "file" content is used for some examples herein, the content may comprise any collection of "data streams" in an unstructured, semi-structured or structured data storage environment, e.g., files, digital documents, streams, blobs, tables, databases, and so forth or possibly other data.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data access, data communication and/or data storage in general.

Figure 1:
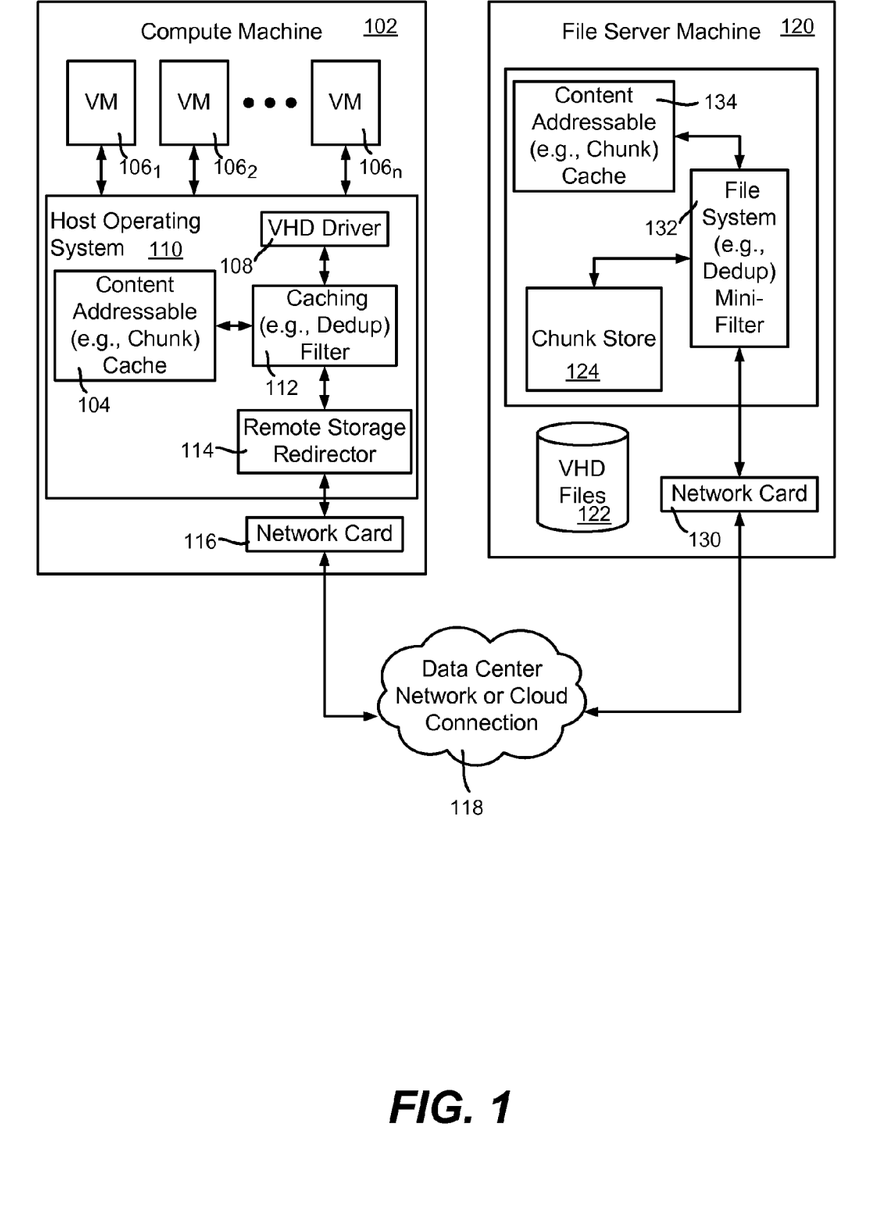
FIG. 1 is a block diagram representing example components for using content addressable caches to return chunks (or the like) of data to virtual machines, according to one example embodiment.

FIG. 1 shows example concepts of one implementation, in which a compute machine 102 includes a content addressable cache 104, e.g., a chunk cache comprising a relatively fast access storage device or devices. In one implementation, the chunk cache may comprise one or more solid state storage devices (SSDs), such as flash memory, or RAM, or a combination of both. For example, SSD is on the order of ten times less expensive per GB than RAM, and is about 100-1000 times faster than hard disk drive access time, and thus fits between the RAM-HDD hierarchy. SSD is also non-volatile, and thus serves as a cache that may be pre-populated (e.g., as described below) without risk of losing data over reboots and the like. The storage may be organized for the underlying media, e.g., log-based storage for solid state devices, e.g., the cache on an SSD may be organized in a log-structured manner to mitigate the random write bottleneck with SSDs, with a multi-threaded cache design with relatively low use of locks to provide high access concurrency. U.S. patent application Ser. No. 13/531,455, "Multi-Tiered Cache with Storage Medium Awareness" describes caching technology that may be adapted for use as any of the content addressable chunk caches as described herein.

When a virtual machine (e.g., $106_1$-$106_n$ collectively, or simply 106 as an example) needs access to content, a file system driver 108 (e.g., a VHD filter driver) running in the host operating system 110 tracks the request to a virtual machine. Further, a caching (e.g., deduplication) filter 112 determines from the content metadata where the data resides, e.g., locally in a file range or in a chunk, e.g., a deduplicated chunk, and handles the read from or write to the appropriate location. Note that writes change the content, and thus the caching (e.g., deduplication) filter 112 may be configured to track which ranges of content are dirtied by writes and which remain in a clean chunk, so that any changed content is not lost, yet the entire set of content (e.g., file) need not be fully recalled to allow modification thereto.

As a virtual machine 106 is intended to be restarted, moved between the various compute machines (e.g., for load balancing) and so forth, the various resources including data do not move with the virtual machine 106. Thus, a file server machine 120 maintains the VHD files 122 so as to be accessible to each computing machine that runs a virtual machine.

Each VHD file tends to be large (e.g., representing an entire hard drive volume), and logically moves to different physical compute machines as needed. Thus it is not practical for each VHD file to be separately cached on each computing machine.

Described herein is the use of content addressable (e.g., chunk) caching, whereby the caching filter 112 can avoid many chunk reads from the remote file server 120 machine that has server-side access to the chunk store 124. Only when remote access is needed does the caching filter 112 (in conjunction with the remote storage redirector 114 and network card 116) need to go "over the wire" 118 for data center network (e.g., LAN) or cloud (e.g., WAN) access to the needed content. As can be readily appreciated, this saves bandwidth and lowers latency.

In one implementation, data deduplication already is in use to save the number of chunks that need to be stored. One primary part of data deduplication involves tracking each chunk of data with a hash value that uniquely identifies that chunk of data. In general, for a deduplicated file or other piece of content, a reference to that chunk, e.g., in the chunk store 124 may be maintained instead of the actual file data. This provides significant savings in situations such as virtualization where a lot of VHD data is the same, e.g., many of the virtual machines' operating system components may correspond to the same versions, and many of the program code versions, data, pictures, video clips and so forth may be the same. Notwithstanding, it is understood that even without storage capacity savings from overall deduplication, bandwidth savings and latency improvements may be obtained by the use of primary deduplication concepts to avoid moving each chunk across a network connection. Thus, as used herein, a "chunk" refers to any block of data that may be uniquely identified and cached, whether or not that chunk is also part of a conventional data deduplication scheme.

Further, sever-side performance may be improved via a similar (or the same) content addressable caching technique. To this end, when a request for content is received at the file server machine 120 (e.g., via its network card 130), a file system mini-filter 132 may use a content addressable (e.g., chunk) cache 134 instead of accessing the requested content from another source, e.g., the chunk store 124 that may be present for data deduplication. This saves significant disk IOPs (or possibly even further network communication) when the same chunks are often requested, which tends to occur in virtualization environments as described herein.

Figure 2:
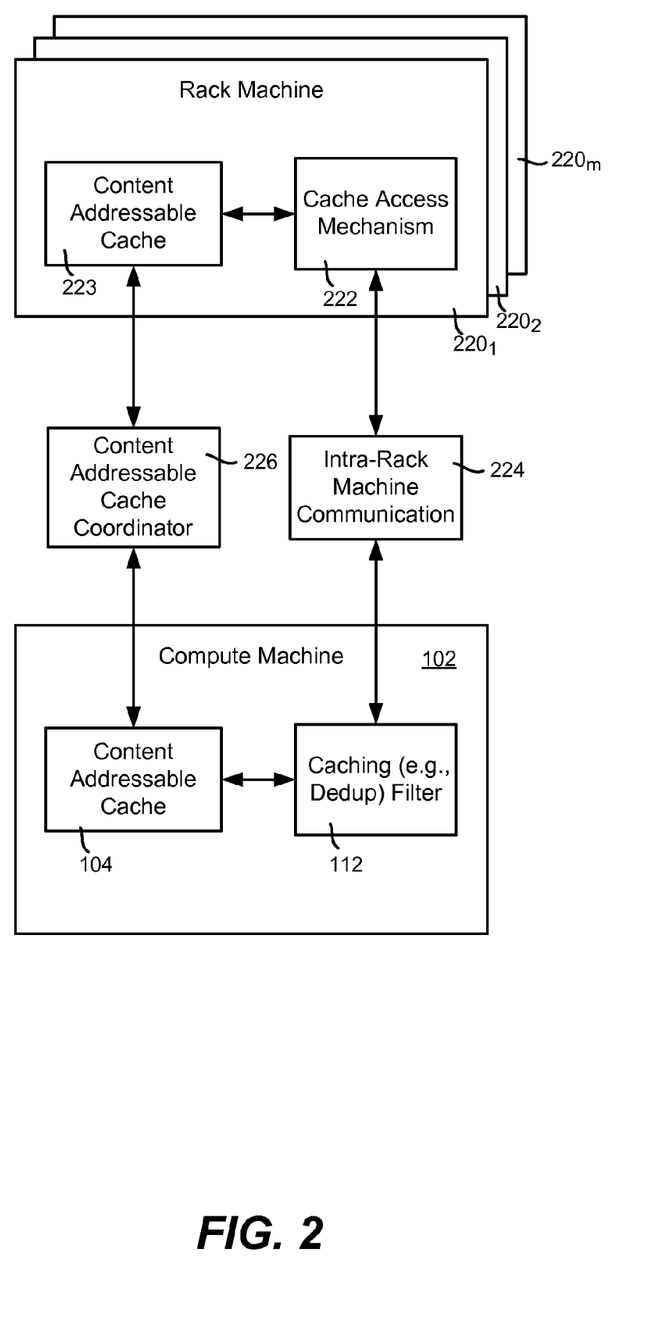
FIG. 2 is a representation of using a plurality of client-side caches to (when possible) avoid requesting content addressable data from a server, according to one example embodiment.

Turning to another aspect, FIG. 2 shows how network communication of chunk data may be further reduced, namely by coordinating with other client-side compute machines $220_1$-$220_m$ to effectively access their cached data (e.g., via blocks 222 and 223) in the event a chunk is not in the compute machine's content addressable cache 104. In FIG. 2, the compute machine 102 of FIG. 1 is configured to communicate via intra-rack machine communication (block 224, including any intermediary components such as a file system, a redirector and so forth) with other machines that are in its same rack, which has very low latency relative to other types of network communication. Notwithstanding, being in the same "rack" is not a requirement for network and bandwidth latency savings via reduced chunk transmission. For example, machines in racks within the same building may communicate faster than to those farther away, a cluster of computers may communicate faster via other communication media than via LAN or WAN connection, and so forth. Thus, one aspect described herein is obtaining the needed data in (typically) the most efficient way possible, such as via a "client-side" cache, e.g., a rack cache.

The caches' content metadata may be synchronized or otherwise communicated in any suitable way. For example, a content addressable cache coordinator 226 may maintain or exchange a list of each cache's chunk identifiers, which can change as chunks are inserted or removed from a cache. The coordinator 226 may be on one machine, or on each machine, or some subset thereof. Then, when a chunk is needed from a different cache, e.g., that of another rack machine, the compute machine knows where to locate that chunk. Alternatively, the compute machine may ask the cache coordinator to retrieve a chunk from another machine. The chunks may be coordinated to avoid duplicates within the same rack, or at least trade off some of them based upon speed versus having a larger number of "more local" chunks. Regardless of which mechanism or mechanisms are used in a given implementation, one concept is to effectively have a shared or larger "more local" cache, which is not necessarily as fast as an actual physically local cache, but relatively faster and less bandwidth consuming than the network connection.

Figure 3:
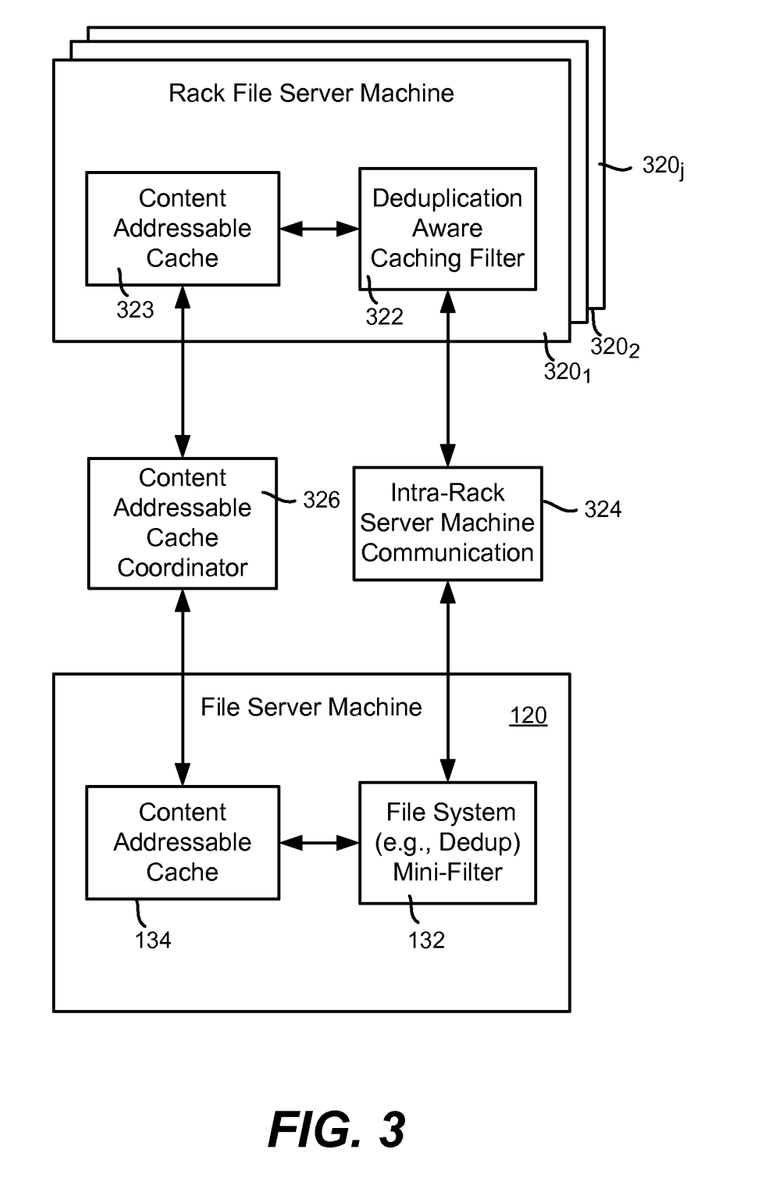
FIG. 3 is a representation of using a plurality of server-side caches to (when possible) avoid requesting content addressable data from a hard disk drive, according to one example embodiment.

FIG. 3 shows the same concept on the server-side, where servers, which may be in the same rack, clustered together, and/or otherwise coupled together in some way that allows cache sharing that is typically faster than going to disk may be provided. For purposes of brevity the same concepts are not repeated, except to note that like components are similarly labeled with 3xx in FIG. 3 instead of 2xx, and the number of servers (e.g., j servers) may be present that need not be the same as the number of illustrated rack machines (e.g., m rack machines) of FIG. 2.

Turning to another aspect, in addition to or instead of conventional cache management techniques (such as eviction of least frequently used/least recently used data), actual data access patterns and other information may be evaluated. For example, when a file is optimized into chunks (e.g., during a deduplication of that file), information about that file may be known, such as its underlying file format. A chunk that is known to be part of an operating system component may be put in one or more of the local and/or server chunk caches even before its first use. Caches may be pre-populated in other ways before access, e.g., when a new operating system version is coming out, during optimization (or any other suitable chunking of the operating system files), the chunks may be cached.

Figure 4:
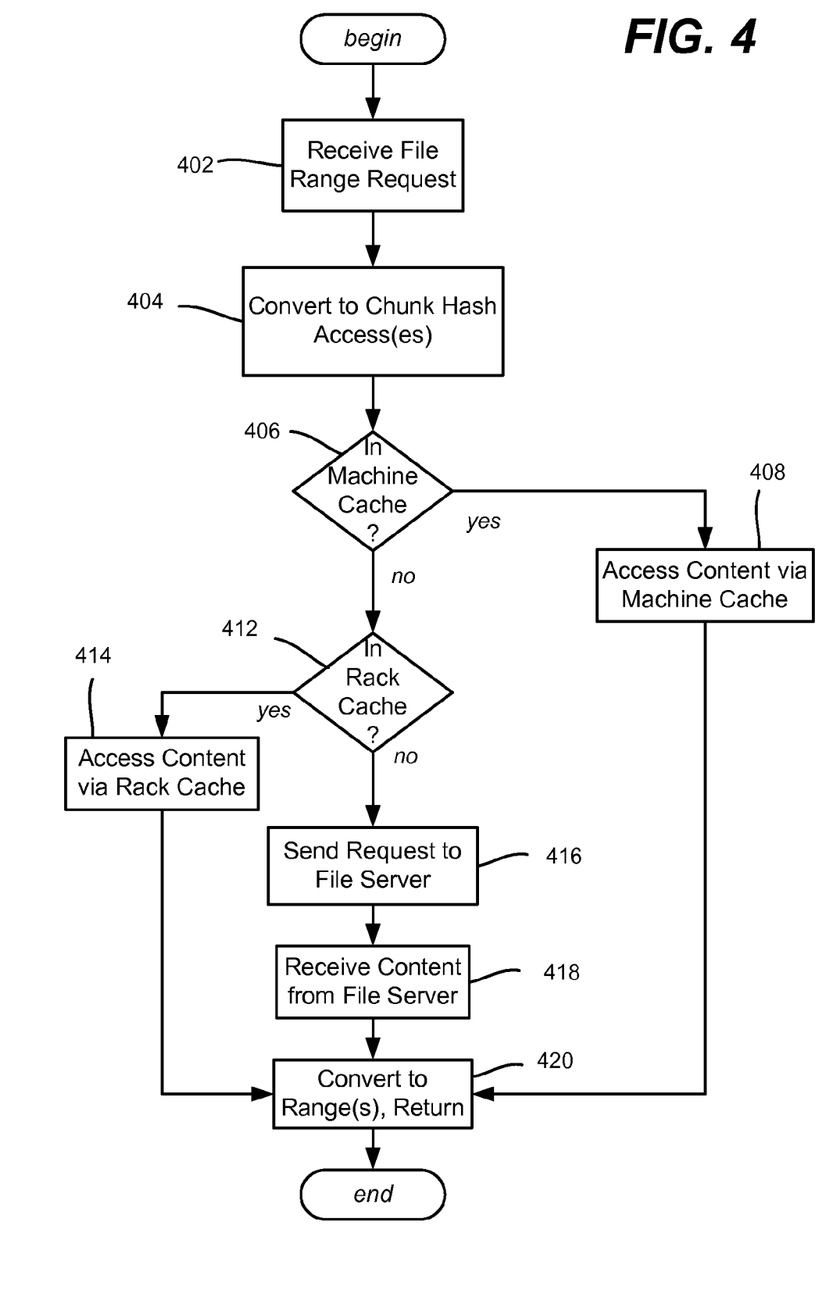
FIG. 4 is a flow diagram representing example steps that a client compute machine may take to obtain and return content addressable data, according to one example embodiment.

FIG. 4 summarizes some example steps when handling a request for content, which is shown as a request to read a range of file data at step 402 from a given computer program. As is known, the metadata associated with that file indicates whether the file has been chunked, e.g., primary data deduplication makes the storage layer content-addressable by converting file range accesses to chunk hash accesses, as generally represented by step 404. Note that "primary data deduplication" as used herein includes such conversion operations, regardless of whether actual data deduplication takes place thereafter.

Step 406 represents looking in the machine cache for the identified chunk; (note that more than one chunk at a time may be handled, e.g., by handling cache lookups separately, which may be in parallel at least in part; however only one chunk is described for purposes of simplicity). If found, the chunk is accessed at step 408, converted back to the requested range or ranges and returned to the driver at step at step 420. Note that steps 404 and 420 are already performed as part of primary data deduplication in a system having this capability.

If at step 406 the compute machine cache did not contain the chunk, step 412 is performed, which represents checking for the chunk in a secondary local cache, which in this example is a rack cache. This may be a request to a rack coordinator, for example, or a lookup of current rack cache chunk IDs. If found, step 414 accesses the content in the rack cache, and step 420 converts the chunk data back to the requested range or ranges for returning in response to the range request.

If not found in a secondary local cache, step 416 sends the request for the chunk to the file server, which (assuming no errors) returns the chunk at step 418, with step 420 converting the chunk data to range data for returning. Note that while not shown for purposes of simplicity, as can be readily appreciated, before sending to a remote file server there may be more than one level of secondary caches to look for the chunk, e.g., first a rack cache, and then a cache at a nearby peer device external to the rack, and so forth, to facilitate faster access than going to a more remote server for the chunk data.

Figure 5:
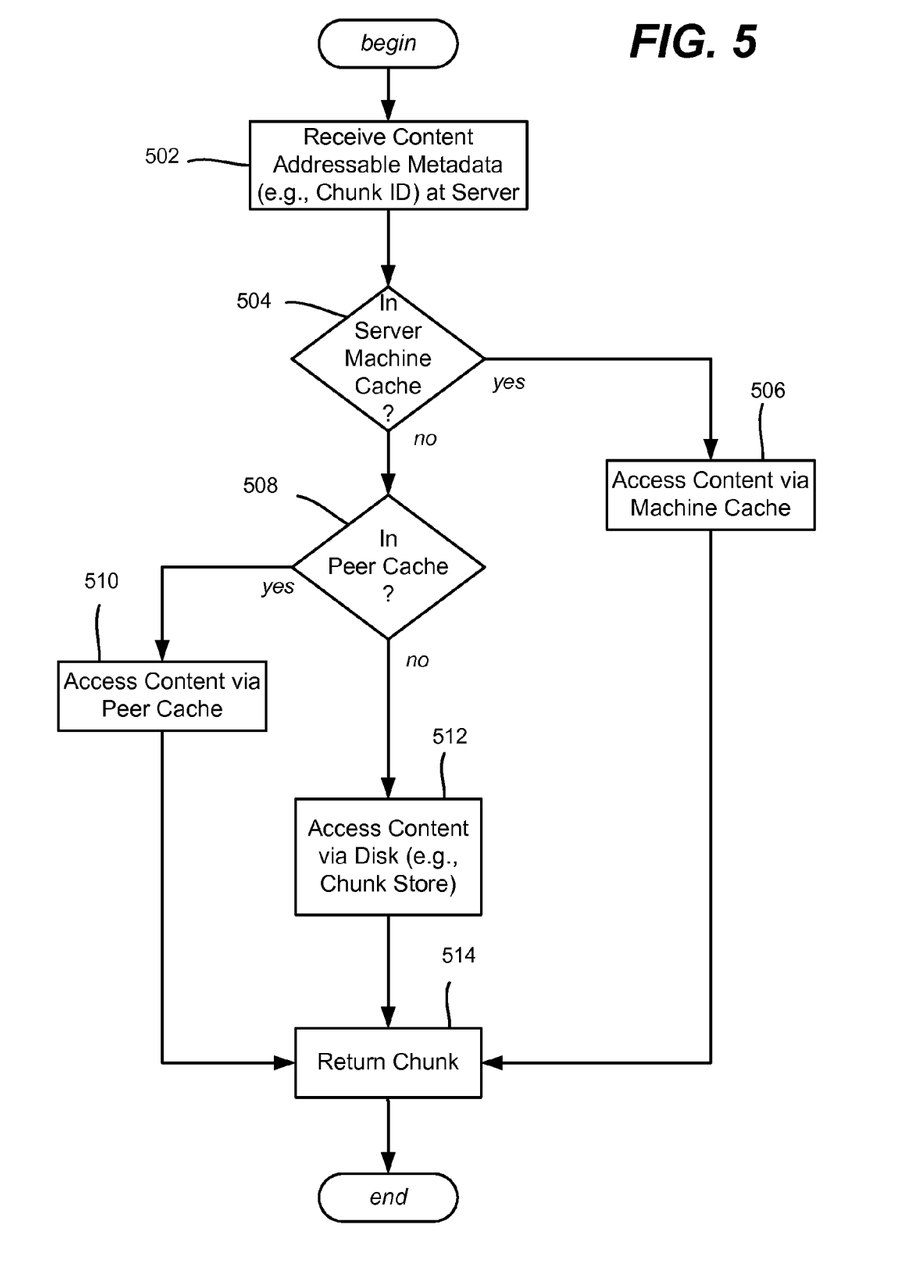
FIG. 5 is a flow diagram representing example steps that a file server machine may take to obtain and return content addressable data, according to one example embodiment.

FIG. 5 exemplifies some of the server operations (for a single chunk for purposes of brevity), beginning at step 502 where the request for the content addressable data is received, e.g., the request may include metadata comprising the chunk identifier. Step 504 looks for the chunk in the file server machine's cache, and if found, steps 508 and 514 access and return the chunk, e.g., to step 418 of FIG. 4.

If not found, step 508 evaluates (which may include a lookup and/or request to a peer or intermediary) whether a peer machine has the chunk in its fast cache. The peer may be another server in the rack, another server in a nearby rack, a server in the datacenter building, and so forth. If found steps 510 and 514 access and return the chunk, e.g., to step 418 of FIG. 4.

If not found in a cache (and there are no more caches to check as in this example) step 512 accesses the content from the disk, e.g., via a deduplication chunk store. Step 514 returns the content, e.g., to step 418 of FIG. 4.

As can be seen, the use of primary data deduplication/data chunking into unique chunks provides for content addressable caching. When similar data access patterns exist across virtual machines (e.g., for VDI), the chunk access patterns may be leveraged to improve storage virtualization performance by caching the data chunks on a fast access tier (flash based SSDs and/or other memory such as RAM). When storage resides on a remote server (as in a separate storage cluster or across the WAN in a public cloud), this approach also translates to savings of bytes transferred over the wire, thus mitigating data center network or WAN bottlenecks.

In an example embodiment, primary data deduplication is enabled on the file server machine. A storage stack deduplication filter with content-addressable cache resides on both compute and storage machines obtain the benefits of both reduced disk IOPs and network latency/bandwidth savings.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
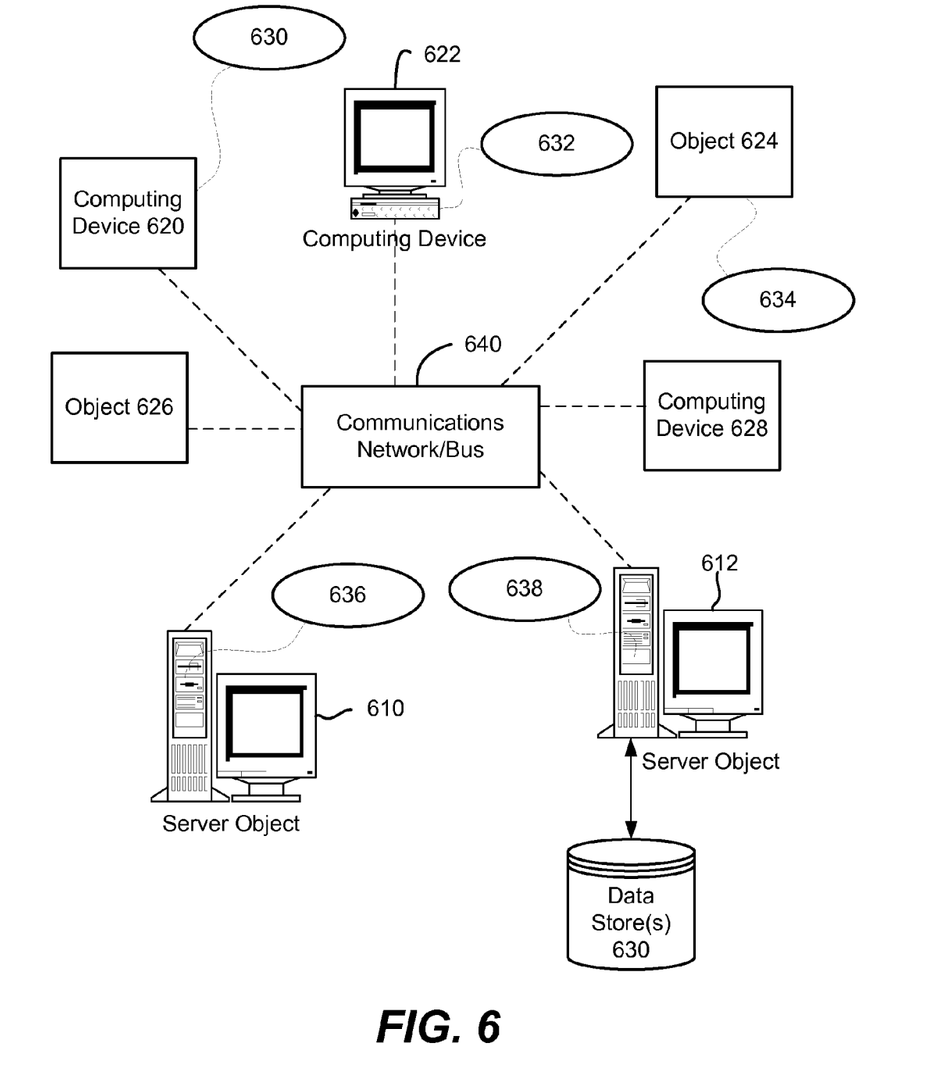
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
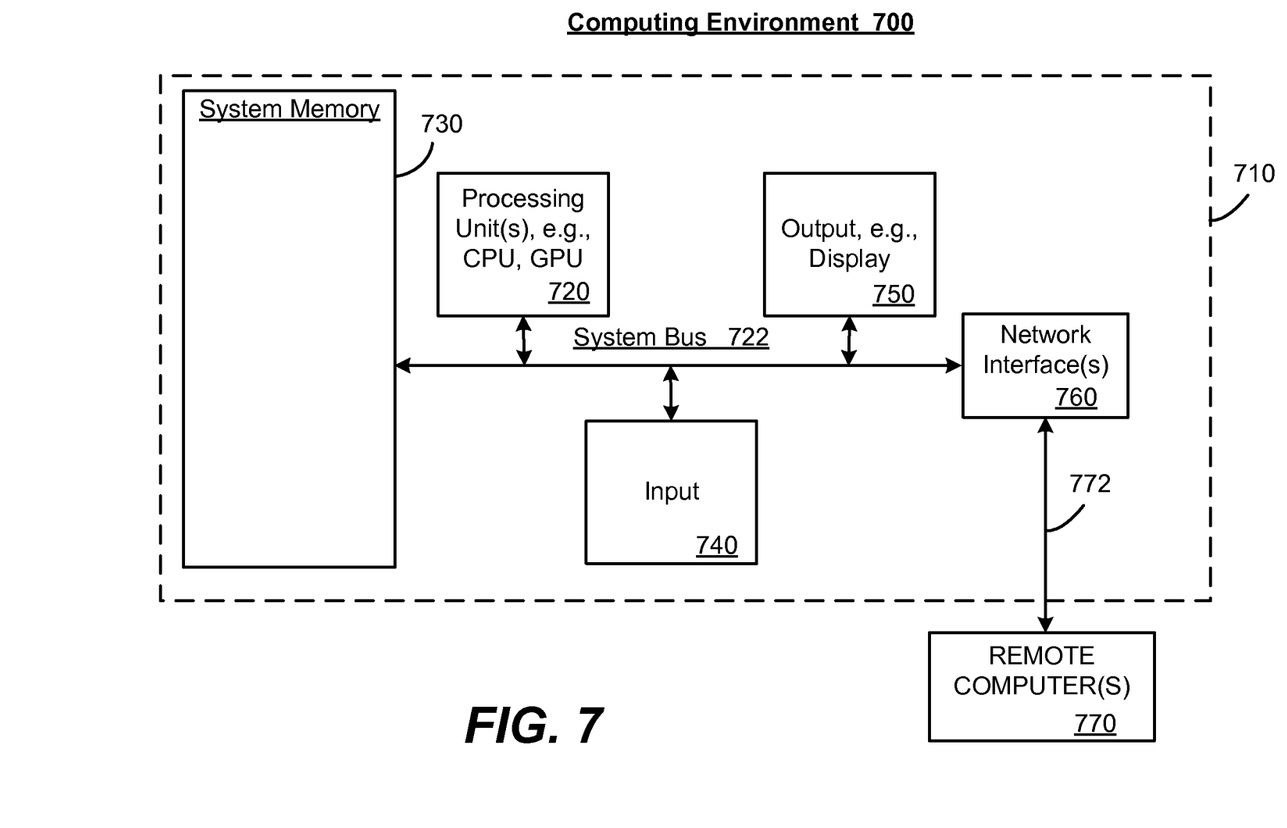
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
   a plurality of client-side content addressable caches storing one or more chunks of data that are associated with file data, a first chunk of the one or more chunks of data stored based at least in part upon access patterns of one or more computing devices accessing first file data corresponding to the first chunk, a second chunk of the one or more chunks of data stored based at least in part upon a file format associated with second file data corresponding to the second chunk;
   a cache coordinator associated with the plurality of client-side content addressable caches, the cache coordinator maintaining a list of individual client-side content addressable cache chunk identifiers and communicating with a file server machine comprising a file system mini-filter, a rack file server machine, and a compute machine; and
   a caching filter, implemented on the compute machine, that:
      converts a requested range of data to a request for content addressable data, including by identifying a storage location associated with the content addressable data;
      on condition that at least one chunk of the one or more chunks of data stored in the plurality of client-side content addressable caches corresponds to the identified content addressable data and is located at a first client-side content addressable cache local to the at least one processor device, accesses the first client-side content addressable cache to obtain the identified content addressable data;
      on condition that the at least one chunk of the one or more chunks of data corresponds to the identified content addressable data, is not located at the first client-side content addressable cache, and is located at a second client-side content addressable cache of the rack file server machine, accesses the second client-side content addressable cache to obtain the identified content addressable data, the rack file server machine comprising a deduplication aware caching filter; and
      on condition that the one or more chunks of data stored on the plurality of client-side content addressable caches do not correspond to the identified content addressable data, transmits a request to return the identified content addressable data to the file server machine via a network.

2. The system of claim 1 wherein at least one of the plurality of client-side content addressable caches comprises a compute machine cache.

3. The system of claim 1 wherein at least one of the plurality of client-side content addressable caches comprises a peer machine cache.

4. The system of claim 1 wherein at least one of the plurality of client-side content addressable caches comprises a client-side rack cache associated with a plurality of compute machines.

5. The system of claim 1 wherein at least one of the plurality of client-side content addressable caches comprises a solid state storage device.

6. The system of claim 1 wherein at least one of the plurality of client-side content addressable caches comprises a nonvolatile storage device.

7. The system of claim 1 wherein at least one of the plurality of client-side content addressable caches comprises a nonvolatile storage device storing at least one chunk of the one or more chunks of data as part of a data chunking operation.

8. The system of claim 1 wherein
   the cache coordinator is communicatively coupled to the cache filter to locate the at least one chunk.

9. The system of claim 1 further comprising the file server machine, the file server machine comprising:
   a plurality of server-side content addressable caches storing one or more chunks of data; and
   the file system mini-filter that, on condition that at least one chunk of the one or more chunks of data stored in the one or more server-side content addressable caches corresponds to the identified content addressable data, accesses the one or more server-side content addressable caches to obtain the content addressable data, and on condition that the at least one chunk does not correspond to the content addressable data, transmits a request to return the content addressable data to a storage device.

10. The system of claim 9 wherein the storage device comprises a chunk store of a data deduplication system.

11. The system of claim 9 wherein at least one of the one or more server-side content addressable caches comprise a peer machine cache.

12. The system of claim 1 wherein at least one of the one or more server-side content addressable caches comprises a nonvolatile storage device storing at least one chunk of the one or more chunks of data based at least in part upon content access patterns.

13. The system of claim 1, further comprising:
a compute machine that comprises one or more computing devices, wherein the one or more computing devices are one or more virtual machines, and the content addressable data is part of a set of virtual storages.

14. In a computing environment, a method for using primary data deduplication to satisfy a request for a range of data by accessing one or more chunks of data associated with one or more identifiers, an individual identifier of the one or more identifiers uniquely identifying content associated with an individual chunk of the one or more chunks of data, the method performed at least in part on at least one computing device, the method comprising:
based on a first identifier, identifying content addressable data that corresponds to the request for the range of data using a caching filter device of a compute machine;
evaluating, by a cache coordinator, whether a chunk of data associated with the identified content addressable data is located in a fast access client-side cache of the compute machine;
on condition that the chunk of data is located in the fast access client-side cache of the compute machine, satisfying the request for the range of data from the fast access client-side chunk cache of the compute machine;
on condition that the chunk of data is located in another fast access client-side cache of another compute machine comprising a deduplication aware caching filter, satisfying the request for the range of data from the other fast access client-side chunk cache of the other compute machine; and
on condition that the chunk of data is not located on one or more fast access client-side caches, transmitting a request for the chunk of data to a file server device via a network, the file server comprising a file system mini-filter.

15. The method of claim 14 wherein evaluating whether the chunk of data associated with the identified content addressable data is located in the fast access client-side cache of the compute machine further comprises:
on condition that the chunk of data is not located in the fast access client-side cache of the compute machine, transmitting a request to a client-side cache coordinator to identify whether the chunk of data is located in the other fast access client-side cache of the other compute machine.

16. The method of claim 14 further comprising:
organizing and managing the fast access client-side cache based upon storage media properties corresponding to the fast access client-side cache, including in a log-structured manner.

17. The method of claim 14 further comprising:
populating the fast access client-side cache as part of a data chunking operation, the fast access client-side cache populated based at least in part on the file format associated with the one or more chunks of data.

18. One or more computer-readable memory devices having computer-executable instructions, which, upon execution, perform operations comprising:
running a plurality of virtual machines;
using data deduplication to identify duplicate data access across the plurality of virtual machines, including generating individual chunk identifiers for individual chunks of data;
arranging one or more chunks of data in a plurality of client-side fast tier caches based at least in part upon access patterns of the plurality of virtual machines accessing the duplicate data and a file format associated with the one or more chunks of data;
converting a received request for a range of data into a request for content addressable data, the request for content addressable data including metadata comprising a chunk identifier; and
identifying a storage location of a chunk of data associated with the content addressable data corresponding to the request using the chunk identifier included in the metadata, including:
evaluating a local client-side fast tier cache to locate the chunk of data,
on condition that the chunk of data is in the local client-side fast tier cache, returning the chunk of data from the local client-side fast tier cache,
on condition that the chunk of data is not in the local client-side fast tier cache, evaluating a peer client-side fast tier cache to locate the chunk of data,
on condition that the chunk of data is in the peer client-side fast tier cache, returning the chunk of data from the peer client-side fast tier cache, and
on condition that the chunk of data is not in the peer client-side fast tier cache, transmitting a request via a network to a server-side cache for the chunk of data to be returned, wherein a client-side cache coordinator is configured to communicate with a caching filter device of a compute machine comprising the local client-side fast tier cache, a file system mini-filter of a file server machine comprising the server-side cache, and a deduplication aware caching filter of a rack file server machine comprising the peer client-side fast tier cache.

19. The one or more computer-readable memory devices of claim 18 wherein evaluating the peer client-side fast tier cache to locate the chunk of data includes further computer-executable instruction, which, upon execution, perform operations comprising:
sending a request to the client-side cache coordinator to return a lookup of current peer client-side fast tier cache chunk identifiers.

20. The system of claim 1, wherein the at least one processor device is configured to organize and manage the plurality of client-side content addressable caches based upon storage media properties associated with the plurality of client-side content addressable caches, including in a log-structured manner.

* * * * *